US006269407B1

(12) United States Patent
Cink et al.

(10) Patent No.: US 6,269,407 B1
(45) Date of Patent: Jul. 31, 2001

(54) METHOD AND SYSTEM FOR DATA FILTERING WITHIN AN OBJECT-ORIENTED DATA

(75) Inventors: Kimberly Ann Cink, Rochester, MN (US); Russell Ley Newcombe, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/616,116

(22) Filed: Mar. 14, 1996

(51) Int. Cl.[7] .......................... G06F 9/00; G06F 15/163; G06F 9/46
(52) U.S. Cl. ............................................. 709/315
(58) Field of Search .................................. 395/683, 600, 395/348, 650, 682, 684, 685, 872; 709/300–305, 310–332; 710/52; 707/102; 717/4

(56) References Cited

U.S. PATENT DOCUMENTS

| | | |
|---|---|---|
| 5,161,225 | 11/1992 | Abraham et al. . |
| 5,247,669 | 9/1993 | Abraham et al. . |
| 5,287,504 * | 2/1994 | Carpenter et al. ............... 395/600 |
| 5,379,426 * | 1/1995 | Foss et al. ........................ 395/683 |
| 5,602,729 * | 2/1997 | Krueger et al. .................. 395/704 |
| 5,664,182 * | 9/1997 | Niernberg et al. ............... 707/102 |
| 5,680,563 * | 10/1997 | Edelman ........................... 395/348 |
| 5,881,315 * | 3/1999 | Cohen ............................... 395/872 |

FOREIGN PATENT DOCUMENTS

WO 95/31780    11/1995    (WO) .

OTHER PUBLICATIONS

Johnson et al., "Using Case Based Reasoning to Locate and Match Object Oriented Classes and Libraries," IBM Technical Disclosure Bulletin, vol. 37, No. 12, pp. 155–160.
Object Management Group, "Joint Object Services Submission: Life Cycle Services Specification," pp. 1–50, Jul. 2, 1993.
OMG, Joint Object Services Submission, Compound Life Cycle Addendum, OMG TC Document 94.5.6, May 30, 1994.*
Timothy O'Brien, "Ion's Orbix: key low–end alternative in the emerging CORBA–compliant market" Distribute Computing Monitor v9 n7 p3(10), Jul. 1994.*
Michael Kelly, "Multithreading with OS/2 and Borland C++", C Users Journal v12 n8 p67(10), Aug. 1994.*
Yellin et al; "Interfaces, Protocols and the Semi–Automatic Construction of Software Adaptors", OOPSLA '94.*
Grossman et al Logical Composition of Object–Oriented Interfaces: OOPSLA '87.*
CORBAservices: Common Object Services Specification (Table of Contents), Mar. 1995.*
Gamma et al, "Design patterns Elements of reusable object–oriented software", pp.87–116, 1995.*
IONA, The Orbix Architecture, pp. 1–23, Jan. 1995.*
Van Camp, Kenneth; "Dynamic inheritance using filter classes", C/C++ Users Journal, v13, n6, p69(10), Jun. 1995.*

* cited by examiner

Primary Examiner—Majid A. Banankhah
Assistant Examiner—P. G. Caldwell
(74) Attorney, Agent, or Firm—David A. Mims, Jr.; Bracewell & Patterson L.L.P.

(57) ABSTRACT

A method and system for filtering a list of data elements within an object-oriented environment are disclosed. According to the present invention, a filter object is created that supports a filter method which discriminates data elements within an input list utilizing a filter criterion. A message is then sent to the filter object specifying an input list of data elements to be filtered. In response to receipt of the message, data elements within the specified input list are discriminated utilizing the filter criterion. In one embodiment, one or more filter objects are registered with a finder object such that a list of data elements satisfying a search criterion produced by the finder object are automatically furnished to the filter objects as an input list.

24 Claims, 8 Drawing Sheets

METHOD AND SYSTEM FOR DATA FILTERING WITHIN AN OBJECT-ORIENTED DATA

BACKGROUND OF THE INVENTION

1. Technical Field

The present invention relates in general to a method and system for data processing and, in particular, to a method and system for data filtering within a data processing system. Still more particularly, the present invention relates to a data processing system and method for filtering an input sequence based upon a selected policy utilizing a filter object within an object-oriented environment.

2. Description of the Related Art

The development of application and system software for data processing systems has traditionally been a time-consuming and somewhat repetitive task, with software developers often having to write or rewrite code to perform well-known user interface and system functions in addition to writing the code utilized to implement the desired new functionality. Recently, object-oriented programming (OOP) has emerged as a dominant new programming paradigm that enables the rapid development and implementation of functionality while permitting the customization and reuse of objects.

The power of OOP as a software development philosophy is realized chiefly through object frameworks, which provide a collection of base object classes that can be selectively utilized by a system developer to create a software system, much like a hardware developer might construct a desktop computer from standard hardware components. Object frameworks are particularly advantageous when utilized within a distributed computing environment in which multiple, possibly heterogeneous, computer systems are interconnected to allow system hardware and software resources to be shared between computer systems. In order to permit programs written in multiple diverse languages to utilize object classes defined within a single object framework, it is necessary to develop a minimum level of object standardization, thereby enabling, at least to some degree, the interoperability of object-oriented software. One organization that is working to establish industry guidelines and object management specifications to provide a common object framework for applicaton development is the Object Management Group (OMG). The specifications promulgated by OMG enable the reusability, portability, and interoperability of object-based software in distributed heterogeneous computing environments (HDCE). An example of a commercially available object framework that conforms to OMG specifications is the Distributed System Object Model (DSOM), which is described, for example, in the SOM Objects Toolkit version 3.0 *Programmer's Guide, Volume 1: SOM and DSOM*, available from International Business Machines Corporation.

The Object Management Group (OMG) defines an industry standard for Life Cycle Services in *CORBAservices: Common Object Services Specification*, OMG Document No. 95-3-31. Within the OMG Life Cycle Services standard, a number of object-oriented programming interfaces are defined in support of the creation and destruction of objects within a heterogeneous distributed computing environment (HDCE). Among the interfaces introduced within the OMG Life Cycle Services standard is the FactoryFinder interface, which provides a standard service that can be utilized by applications to locate a Factory object (i.e., an object that creates other objects) within the heterogeneous distributed computing environment (HDCE).

The OMG FactoryFinder interface introduces an operation called find_factories, which returns an Interface Definition Language (IDL) sequence of Factory objects that satisfy input criteria specified within a factory_key input parameter. In heterogeneous distributed data processing systems that contains hundreds or thousands of objects, of which many may satisfy a particular factory_key, the number of Factory objects returned in the sequence can be large. Consequently, the user may desire to reduce the number of objects returned by the FactoryFinder on the basis of an additional static policy, such as a specific server on which the Factory objects reside. In addition, the user may desire to limit the number of Factory objects returned in the FactoryFinder search on the basis of a dynamic policy, for example, the CPU usage of the servers on which the Factory objects reside.

Although additional filtering of IDL sequences returned by OMG FactoryFinder objects is highly desirable, the OMG specifications do not define a standard interface which enables a user to reduce the number of Factory objects remaining within the sequence. Although additional policies may be encapsulated within a FactoryFinder object, each of these additional policies would require a unique implementation of FactoryFinder. In addition, a unique FactoryFinder implementation would be required to combine multiple policies within a single FactofyFinder. Consequently, it would be desirable to provide an interface capable of filtering input sequences based upon a selected policy, and more particularly, an interface compatible with the OMG FactoryFinder interface that filters IDL sequences generated by a FactoryFinder based upon a user-selected dynamic policy. It is also desirable to be able to associate one or more filtering objects with a FactoryFinder object so that any combination of policies can be supported by a single FactoryFinder implementation.

SUMMARY OF THE INVENTION

It is therefore one object of the present invention to provide an improved data processing system.

It is another object of the present invention to provide a method and system for data filtering within a data processing system.

It is yet another object of the present invention to provide a data processing system and method for filtering an input sequence based upon a selected policy utilizing a filter object within an object-oriented environment.

It is still another object of the present invention to provide one or more filter objects within an object-oriented environment which are each associated with a particular object such that a combination of filtering policies is supported for a single implementation of the particular object.

The foregoing objects are achieved as is now described. A method and system for filtering a list of data elements within an object-oriented environment are disclosed. According to the present invention, a filter object is created that supports a filter method which discriminates data elements within an input list utilizing a filter criterion. A message is then sent to the filter object specifying an input list of data elements to be filtered. In response to receipt of the message, data elements within the specified input list are discriminated utilizing the filter criterion. In one embodiment, one or more filter objects are registered with a finder object such that a list of data elements satisfying a search criterion produced by the finder object are automatically furnished to the filter objects as an input list.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
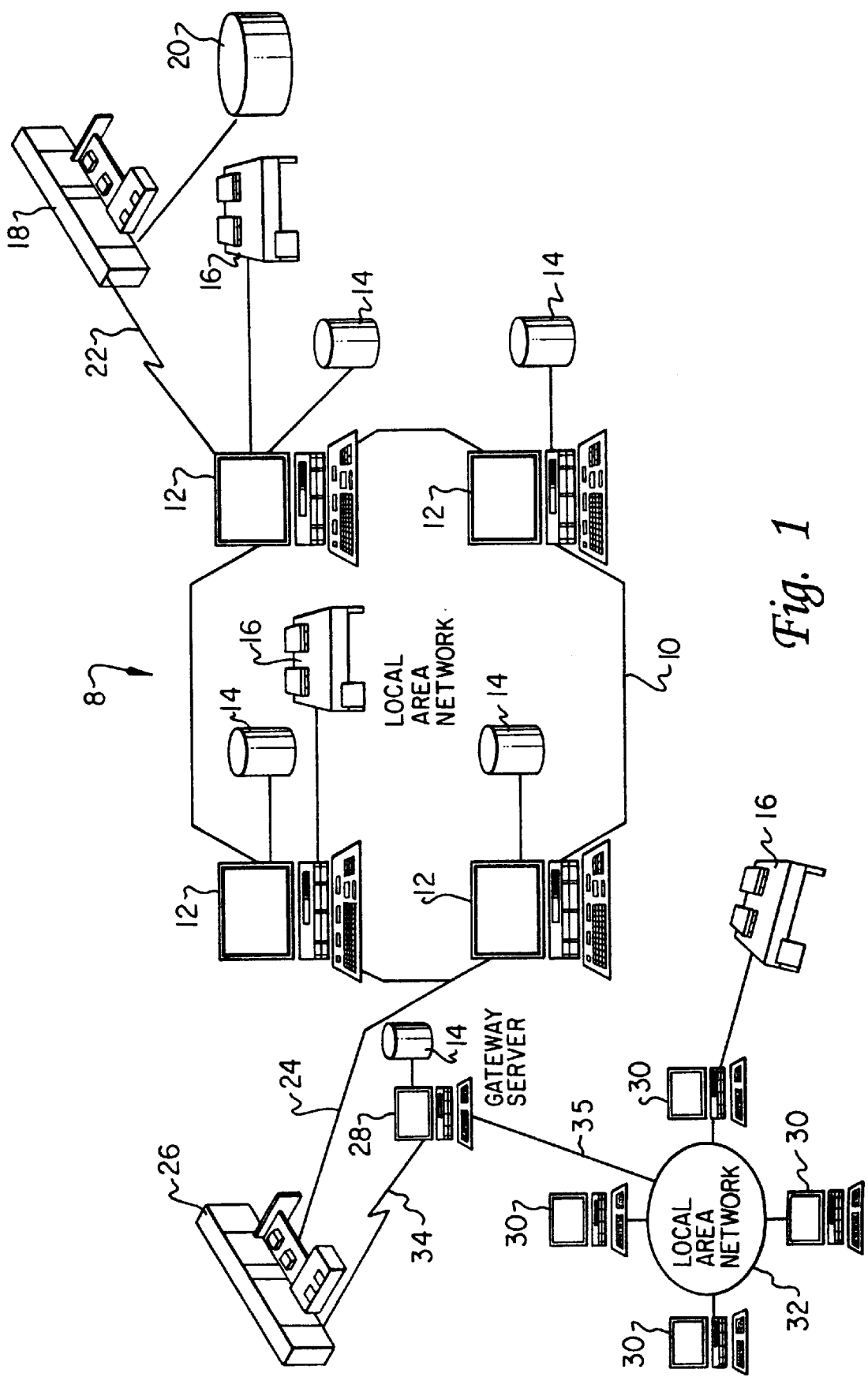
FIG. 1 is an illustrative embodiment of a heterogeneous distributed data processing system in accordance with the present invention.

With reference now to the figures and in particular with reference to FIG. 1, there is illustrated a pictorial representation of a data processing system 8 which may be utilized to implement the method of the present invention. As illustrated, data processing system 8 contains a plurality of networks, including local area networks (LAN) 10 and 32, each of which preferably includes a plurality of individual computers 12 and 30, respectively. Those skilled in the art will appreciate that a plurality of workstations coupled to a host processor may be utilized for each such network. As is common in such data processing systems, each computer 12 and 30 may be coupled to a storage device 14 and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20 which serves as remote storage for LAN 10. LAN 10 is also coupled via communications link 24 through communications controller 26 and communications link 34 to gateway server 28. Gateway server 28 is in turn linked to LAN 32 by communications link 35. As will be understood by those skilled in the art, data processing system 8 additionally includes unillustrated gateways, routers, bridges, and various other network hardware utilized to interconnect the segments of data processing system 8.

Figure 2:
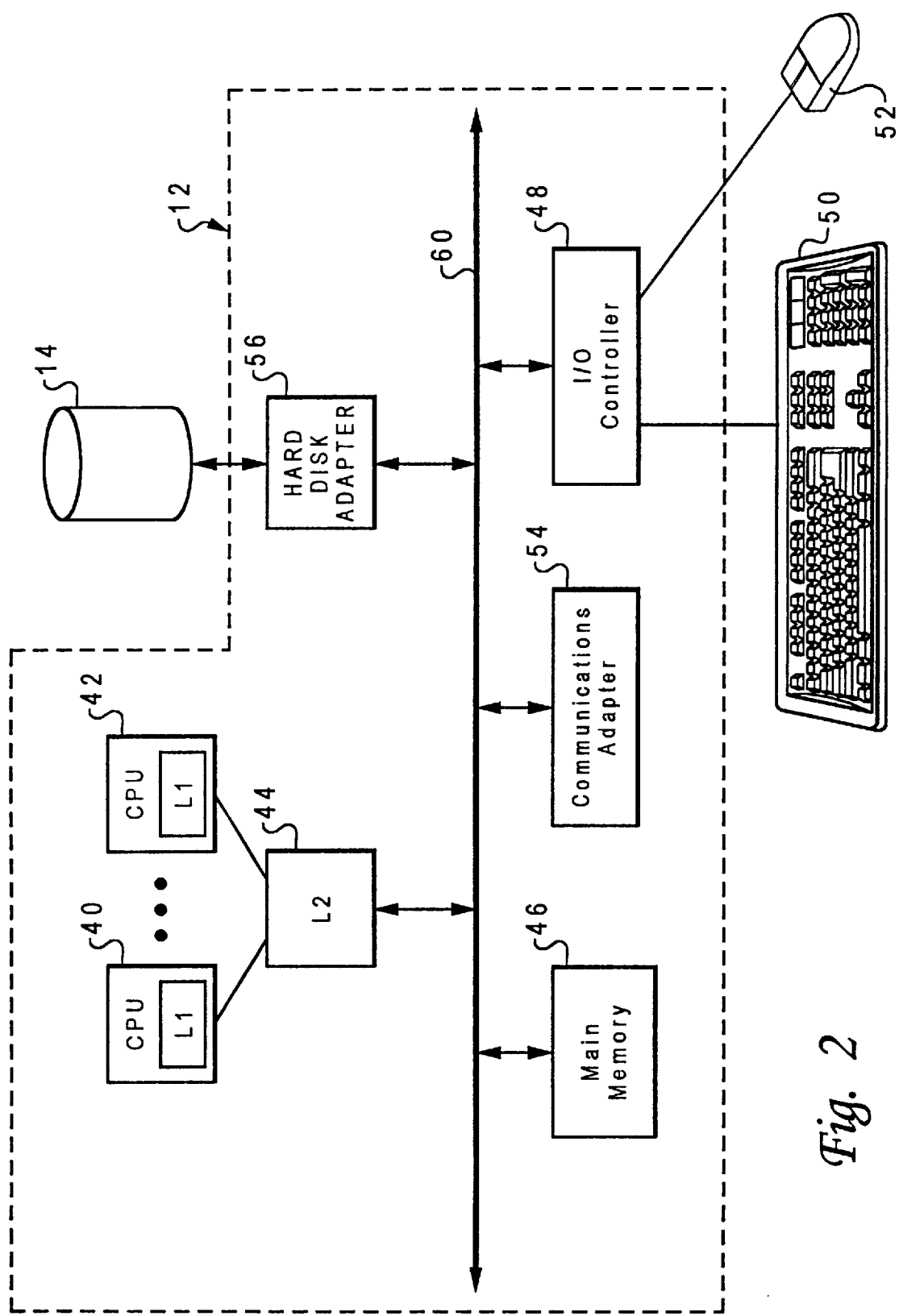
FIG. 2 depicts a block diagram of an illustrative embodiment of the system unit of a computer within the heterogeneous distributed data processing system illustrated in FIG. 1.

Referring now to FIG. 2, there is depicted a block diagram of an illustrative embodiment of the system unit of a computer 12 within data processing system 8. As illustrated, computer 12 preferably includes one or more processors 40, which preferably run under a multitasking, object-oriented operating system such as OS/2; however, those skilled in the art will appreciate that other operating systems such as AIX (Advanced Interactive Executive) can alternatively be employed. Computer 12 further includes a memory hierarchy, comprising level one (L1) caches 42, level two (L2) cache 44, and main memory 46, which are coupled to processors 40 for rapid storage and retrieval of data and instructions. Data and instructions can similarly be stored to nonvolatile storage device 14, which is coupled to processors 40 via system bus 60 and hard disk adapter 56. Computer 12 also includes input/output (I/O) controller 48 and communications adapter 54. I/O controller 48 supports the attachment of one or more user input devices such as keyboard 50 and mouse 52 to computer 12. Communications adapter 54, on the other hand, is coupled to system bus 60 and LAN 10 to facilitate data communication between computer 12 and the other hardware components of data processing system 8. As will be appreciated by those skilled in the art, computer 12 includes additional devices which are not necessary for an understanding of the present invention and are accordingly omitted from FIG. 2 for the sake of simplicity.

Figure 3:
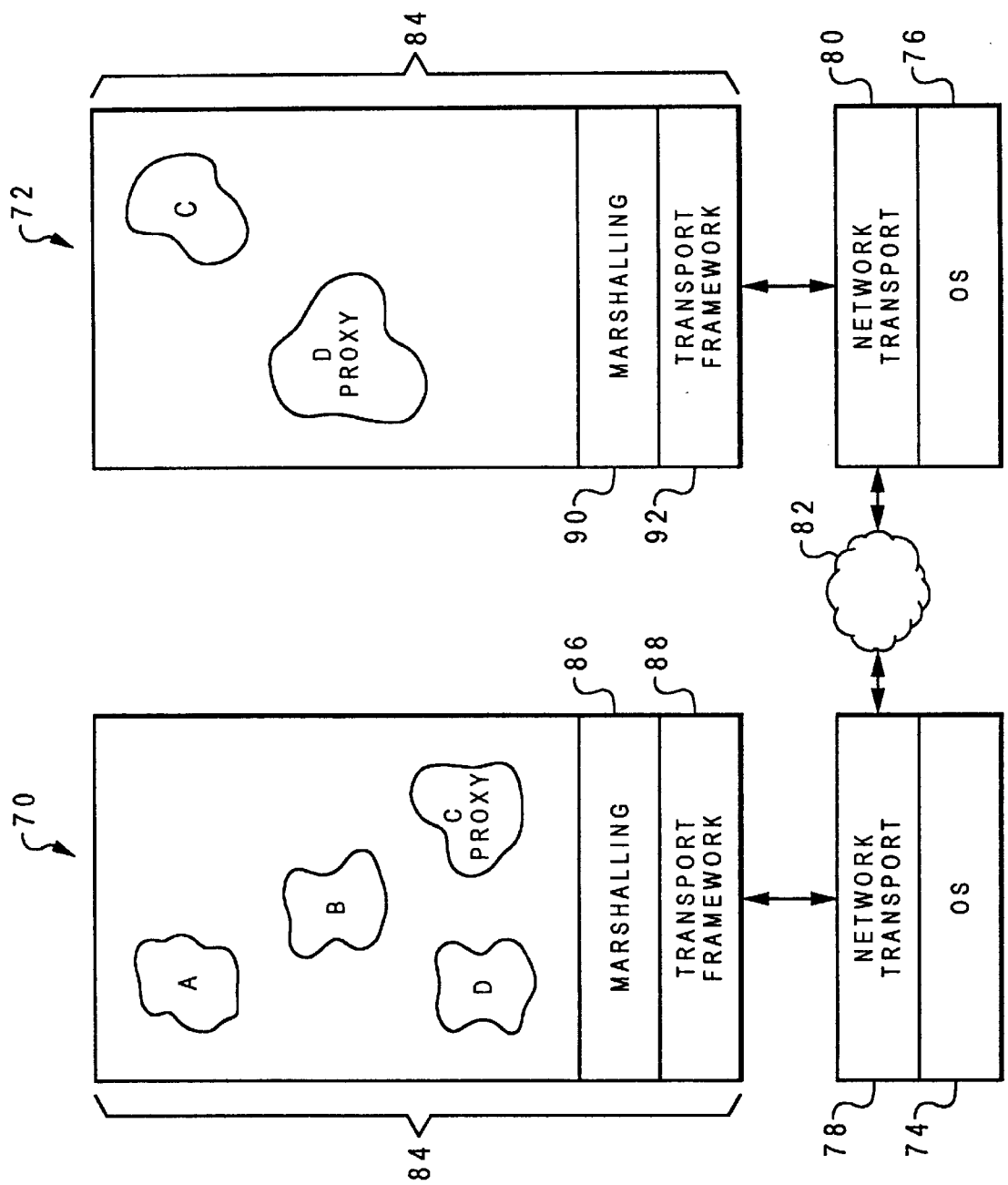
FIG. 3 illustrates a pictorial representation of the generalized software configuration of two nodes within a heterogeneous distributed object-oriented computing environment.

With reference now to FIG. 3, there is illustrated a pictorial representation of the generalized software configuration of two nodes 70 and 72 within a heterogeneous distributed computing environment (HDCE), such as data processing system 8. Those skilled in the art will appreciate that the software configuration of each of nodes 70 and 72 can reside within volatile storage, such as cache or main memory, and/or nonvolatile storage, such as a hard disk or CD-ROM. As illustrated, nodes 70 and 72, which can comprise two of computers 12 within data processing system 8, execute software under the control of possibly diverse operating systems 74 and 76, respectively. Although diverse operating systems may be utilized by nodes 70 and 72, intercommunication between nodes 70 and 72 via network 82 is facilitated by network transport layers 78 and 80, which can comprise Transport Control Protocol/interface Program (TCP/IP), for example.

The software configurations of nodes 70 and 72 further comprise a distributed object environment 84 including objects A, B, C, and D. To illustrate the interaction of objects A-D within distributed object environment 84, assume that object A invokes a method of objects B and C, passing object D as a parameter, and that objects B and C belong to the same class. If object A calls object B, a local object, all of the interaction between objects A, B, and D occurs within the same local process and is controlled strictly by the dispatching and reference mechanisms of the local process. On the other hand, if object A calls object C, a remote object, the call is directed to object C proxy, which interacts with marshalling code 86 and transport framework 88 to package the call parameters into a message having a format suitable for transmission over network 82. In response to receipt of the message at node 72, network transport 80 passes the message to transport framework 92 and marshalling code 90, which unmarshal the parameters to reconstruct the call of object C. Thereafter, an object D proxy is created and object C is called in the same manner as if object C was local to object A. Any requests from object C to object D are similarly handled through object D proxy. As can be seen from this description of a distributed object environment, an object can transparently interact with other objects within the distributed object environment without regard to whether the other objects reside at a local or remote node or whether the objects are within the same process.

Figure 4:
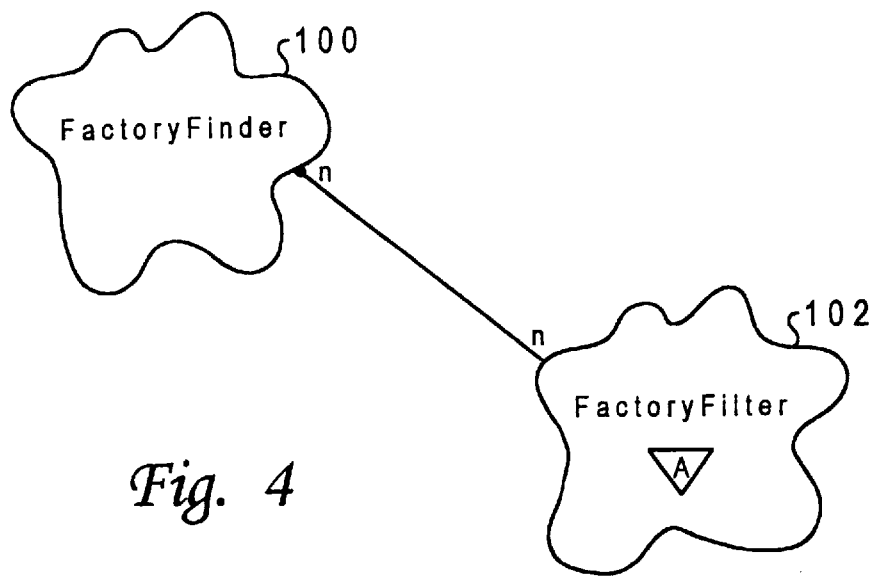
FIG. 4 depicts a class diagram illustrating the class relationship between the OMG FactoryFinder class and the FactoryFilter class, which is created in accordance with a preferred embodiment of the present invention in order to provide dynamic filtering capabilities.

Referring now to FIG. 4, there is depicted a class diagram illustrating the class relationship of the OMG FactoryFinder class and the FactoryFilter class, which is created in accordance with a preferred embodiment of the present invention to provide dynamic filtering capabilities. As depicted in Booch class diagram notation, an instance of FactoryFinder class 100 can contain n (zero or more) instances of FactoryFilter class 102 and an instance of FactoryFilter class 102 can be contained by n instances of FactoryFinder class 100. FIG. 4 also illustrates that FactoryFilter class 102 defines an abstract interface inherited by all other FactoryFilter interfaces, rather than a specific implementation in order to permit a user to construct a FactoryFilter subclass that satisfies particular environmental requirements. Further information about Booch class diagram notation can be found in Grady Booch, *Object Oriented Design with Applications,* pp. 158–167.

Figure 5:
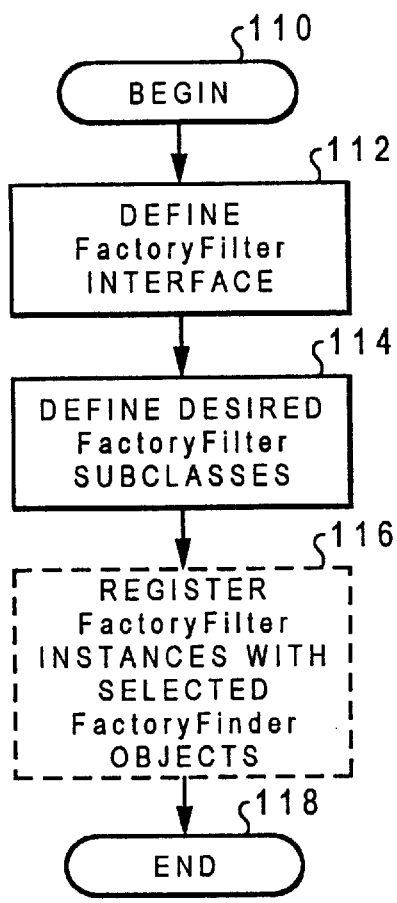
FIG. 5 is a flowchart illustrating a method of creating a FactoryFilter object and associating the FactoryFilter object with a FactoryFinder object in accordance with a preferred embodiment of the present invention.

With reference now to FIG. 5, there is illustrated a flowchart of a method of creating a FactoryFilter object and associating the FactoryFilter object with a FactoryFinder object in accordance with a preferred embodiment of the present invention. As illustrated, the process begins at block 110 and thereafter proceeds to block 112, which depicts defining the FactoryFilter class interface. As noted above, the FactoryFilter interface is-an abstract interface that may be utilized by a programmer to build a filter that discriminates an input sequence based upon a specified policy. In accordance with a preferred embodiment of the present invention, the Factory_Filter interface introduces the method filter_factories, which accepts a sequence of input factories and specific user-defined policies as inputs, and returns a sequence of factories that satisfy the specified value of the policy inputs. An exemplary interface definition language (IDL) code segment utilized to create a FactoryFilter interface is as follows:

interface FactoryFilter {
    void filter_factories(inout sequence_of_factories
      factories,
      in user_specific_policy_info policy);
}

Although it is possible to create instances of the abstract FactoryFilter interface, it is preferable to subclass the abstract FactoryFilter interface in order to provide dynamic filtering capabilities tailored to the user's application environment. Therefore, referring again to FIG. 5, following the definition of the abstract FactoryFilter interface at block 112, the process proceeds to block 114, which illustrates the definition of one or more subclasses of the abstract FactoryFilter interface. Utilizing the abstract FactoryFilter interface in conjunction with one or more subclasses enables a user to override the filter_factories method and provide an implementation that satisfies the requirements of the user's environment and desired policies. In addition to inheriting the properties of the abstract FactoryFilter interface, each user-defined subclass can be advantageously arranged by the user in multiple inheritance relationships with other interfaces that provide other requirements of the environment, such as object persistence. An exemplary IDL code segment that can be utilized to create a subclass of the previously defined abstract FactoryFilter interface is as follows:

interface CPUFilter: FactoryFilter {}

This particular CPUFilter would override and implement the filter_factories method. This implementation can be utilized, for example, to control where a particular object is created by identifying Factory objects within a sequence which reside on servers with a CPU usage less than a value specified by a policy parameter. One software implementation for the filter_factories method of the CPUFilter interface is described by the following:

if (input sequence and input policy (or policies) are valid)
    while (there are still factories to examine in the sequence)
      obtain server of factory in question
      obtain CPU usage percentage of that server
      if (server CPU usage >input policy parameter)
        remove factory from the sequence
        free the memory allocated for the removed factory
    return the sequence of remaining factories to the user
else raise an exception Following the definition of one or more subclasses of the abstract FactoryFilter interface at block 114 of FIG. 5, the filter_factories methods of instances of the FactoryFilter subclasses can be invoked directly, or optionally, instances of the FactoryFilter subclasses can be registered with one or more FactoryFinder objects. Thus, as illustrated in FIG. 5, if the user desires to register instances of the FactoryFilter subclasses with FactoryFinder objects, the process proceeds from block 114 to block 116, which depicts the registration process.

As described above with reference to FIG. 4, a FactoryFinder object can have any number of registered FactoryFilter objects that define additional filtering policies to be applied to the sequence returned by the factory search. A FactoryFilter object is registered with a FactoryFinder object by invoking an add_factory_filter method supported by the FactoryFinder object and passing in a unique identifying name, a reference to the FactoryFilter object, and the default parameter to be used on filter_factories method invocations (i.e., the default policy). An exemplary IDL code sequence for coordinating the associations of FactoryFilters with FactoryFinders is as follows:

interface myFactoryFinder : CosLifeCycle::FactoryFinder{
    void add_factory_filter(in unique_name FFname,
      in default_value_specification default,
      in FactoryFilter FFilter);
    void remove_factory_filter(in unique_name FFname);
    seq_of_filter list_factory_filterso();
}

Because each registration of a FactoryFilter object utilizes a unique name, a user is permitted to register the same FactoryFilter object with a single FactoryFinder object multiple times. Multiple registrations of the same FactoryFilter subclass are advantageous if the filter_factories method of the FactoryFilter subclass performs different filtering functions based upon the values specified in the policy parameter or if filtering a sequence multiple times utilizing different input parameters is desired. Following the optional registration of one or more instances of FactoryFilter subclasses with a FactoryFinder at block 116, the process depicted in FIG. 5 terminates at block 118.

In addition to the FactoryFilter registration facilities provided by the add_factory_filter method, the FactoryFinder class preferably defines a remove_factory_filter method and a list_factory_filters method. As its name implies, the remove_factory_filter is invoked to deregister an identifying name of a FactoryFilter from the FactoryFinder object. When deregistered from the FactoryFinder object, the specified FactoryFilter is not deleted; the FactoryFilter may remain registered with the FactoryFinder under a different identifying name in addition to maintaining registration with other FactoryFinder objects. The list_factory_filters method, on the other hand, provides a listing of all FactoryFilter objects currently registered with the FactoryFinder along with the identifying names for each and the associated default parameter values.

Figure 6:
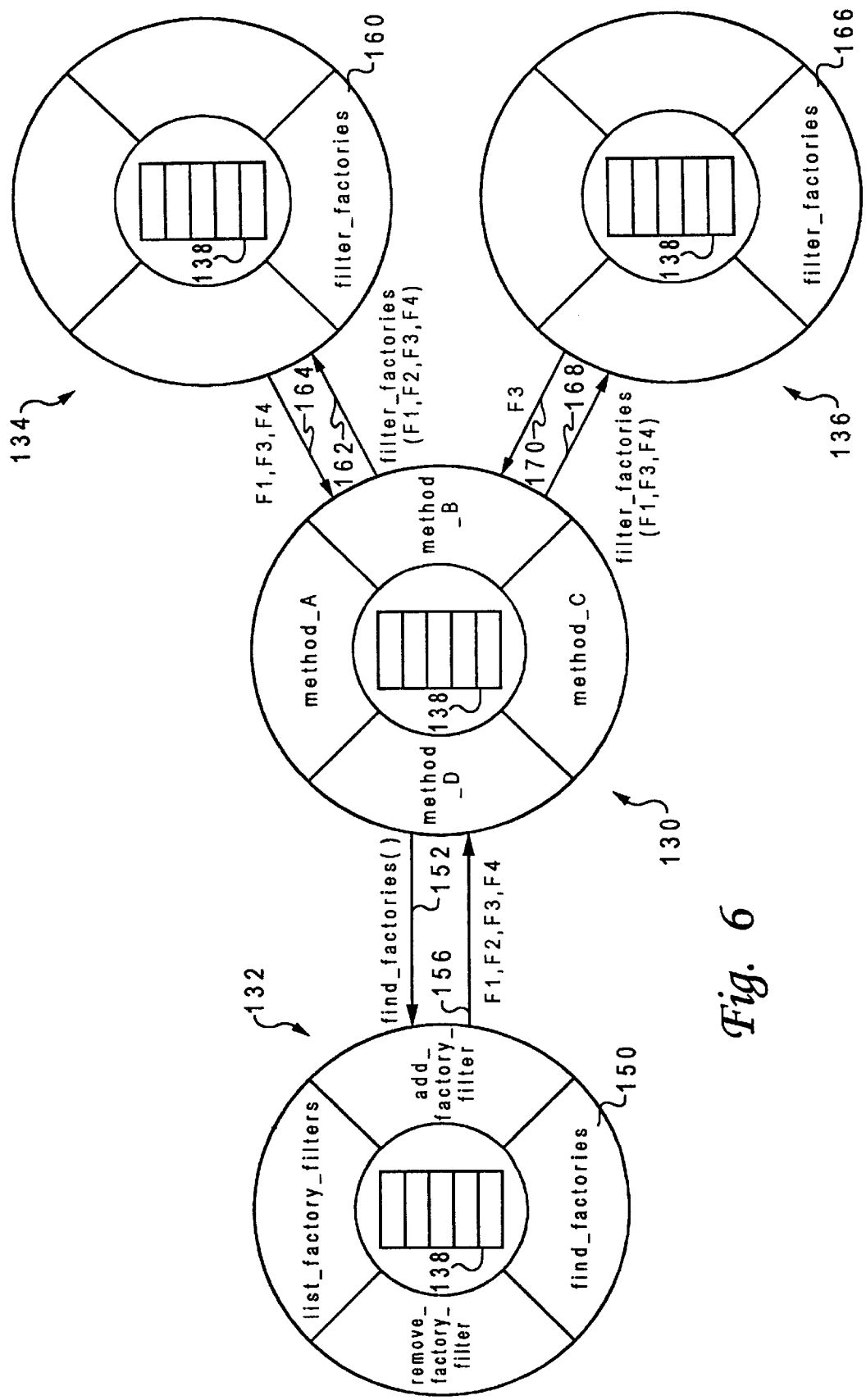
FIG. 6 depicts an object diagram detailing the interaction of a FactoryFilter object and other objects within a distributed object environment in accordance with a first illustrative embodiment of the present invention.
Figure 7:
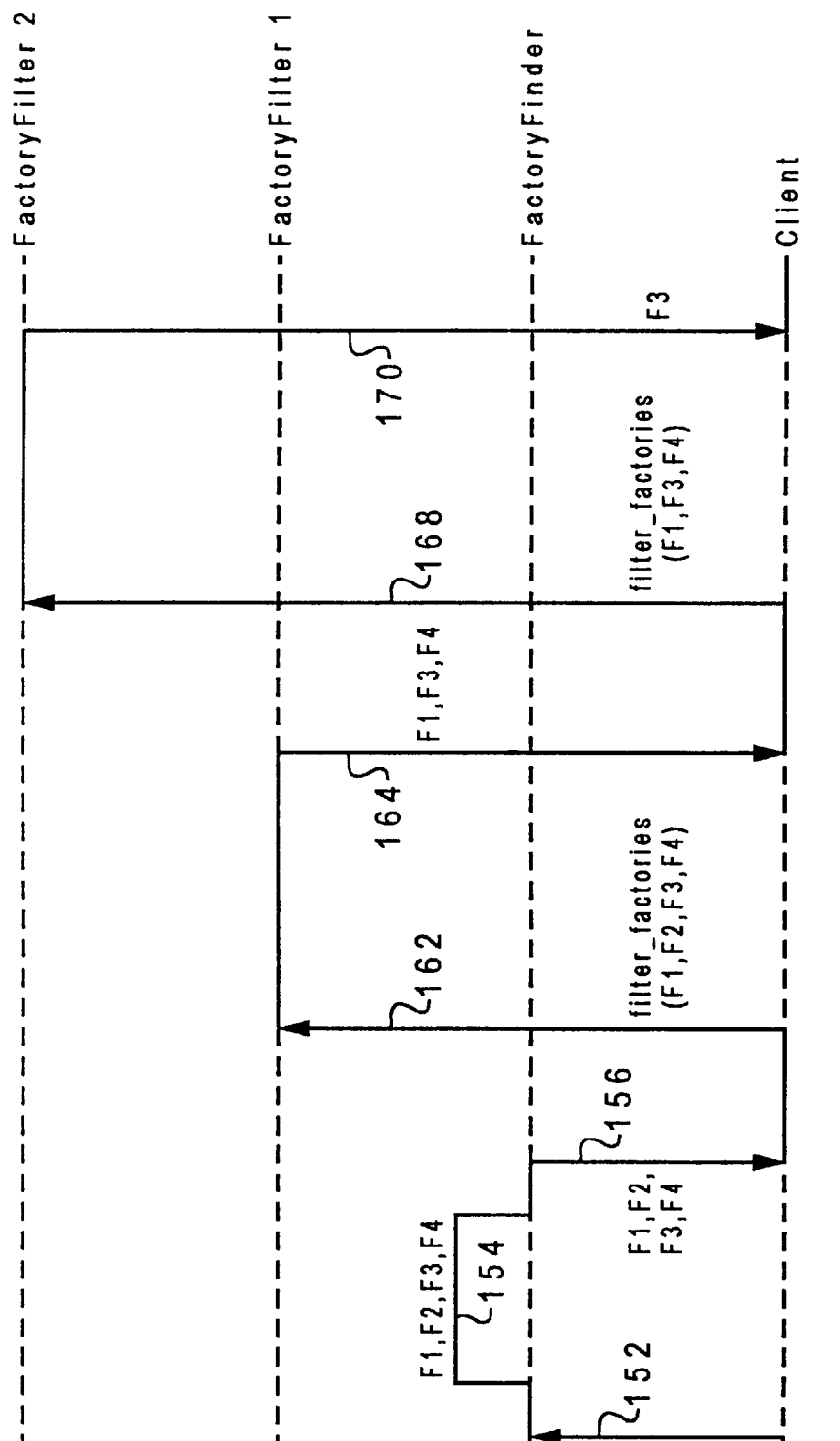
FIG. 7 illustrates a timing diagram of the interaction of a FactoryFilter object and other objects within a distributed object environment in accordance with a first illustrative embodiment of the present invention.

With reference now to FIGS. 6 and 7, there are illustrated an object diagram of a distributed object environment including a FactoryFilter object and a timing diagram illustrating the interaction of objects within the distributed object environment in accordance with a first illustrative embodiment of the present invention. In the first illustrative embodiment, the filter_factories methods of two unregistered FactoryFilter objects are invoked directly by a client object. Referring first to FIG. 6, the distributed object environment includes a client object 130, a FactoryFinder object 132, a CPUFilter object 134, and a OSFilter object 136, which are each represented by a "doughnut diagram" in which object data 138 is shown at the center surrounded by one or more methods.

To obtain a listing of Factory objects qualified by a specified factory_key parameter, client object 130 invokes find_factories method 150 on FactoryFinder object 132, as illustrated in FIGS. 6 and 7 at reference numeral 152. The factory_key parameter passed in the call to FactoryFinder object 132 includes an object interface specification, which specifies a principal interface that must be supported by objects created by each returned Factory object, and can optionally include a factory interface, which specifies a required principal interface for each returned Factory object, as well as other constraints. In response to invocation by client object 130, find_factories method 150 locates all Factory objects that satisfy the specified object interface and any specified constraints. Find_factories method 150 further limits the returned sequence of Factory objects utilizing the factory interface. The determination of Factory objects F1, F2, F3, and F4 as Factory objects that satisfy the specified factory_key parameter is depicted at reference numeral 154 of FIG. 7. Thereafter, FactoryFinder object 132 returns the sequence of Factory objects containing Factory objects F1, F2, F3, and F4 to client object 130 as illustrated at reference numeral 156.

In order to further reduce the number of Factory objects within the returned sequence, client object 130 directly invokes the filter_factories methods of one or more stand-alone FactoryFilter objects in accordance with the first preferred embodiment of the present invention. For example, to discriminate the Factory objects within the sequence on the basis of the CPU usage of the servers upon which the Factory objects reside, client object 130 invokes filter_factories method 160 on CPUFilter object 134, passing all required parameters including the policy parameter containing the desired maximum CPU utilization percentage and the Factory object sequence containing Factory objects F1, F2, F3, and F4. The invocation of filter_factories method 160 is shown in FIG. 6 and 7 at reference numeral 162. Following the execution of filter_factories method 160, CPUFilter object 132 returns a sequence listing Factory objects F1, F3, and F4, which each reside on a server having a CPU usage less than the specified percentage, as depicted at reference numeral 164. Thereafter, as illustrated at reference numeral 168, client object 130 discriminates the remaining Factory objects on the basis of the operating system running on the servers on which the Factory objects reside by invoking filter_factories method 166 on OSFilter object 136 and passing in Factory objects F1, F3 and F4 and a specified operating system. Like filter_factories method 160, filter_factories method 166 implements a user-specified dynamic policy. In the present example, following completion of filter_factories method 166, OSFilter object 136 returns a sequence to client object 130 (see reference numeral 170) containing the single Factory object F3, which resides on a server running the specified operating system. Client object 130 can now utilize Factory object F3 in any meaningful way in subsequent processing. For example, client object 130 can invoke a create method on Factory object F3 to create an object of a particular type on a server having a low CPU usage and a preferred operating system.

Figure 8:
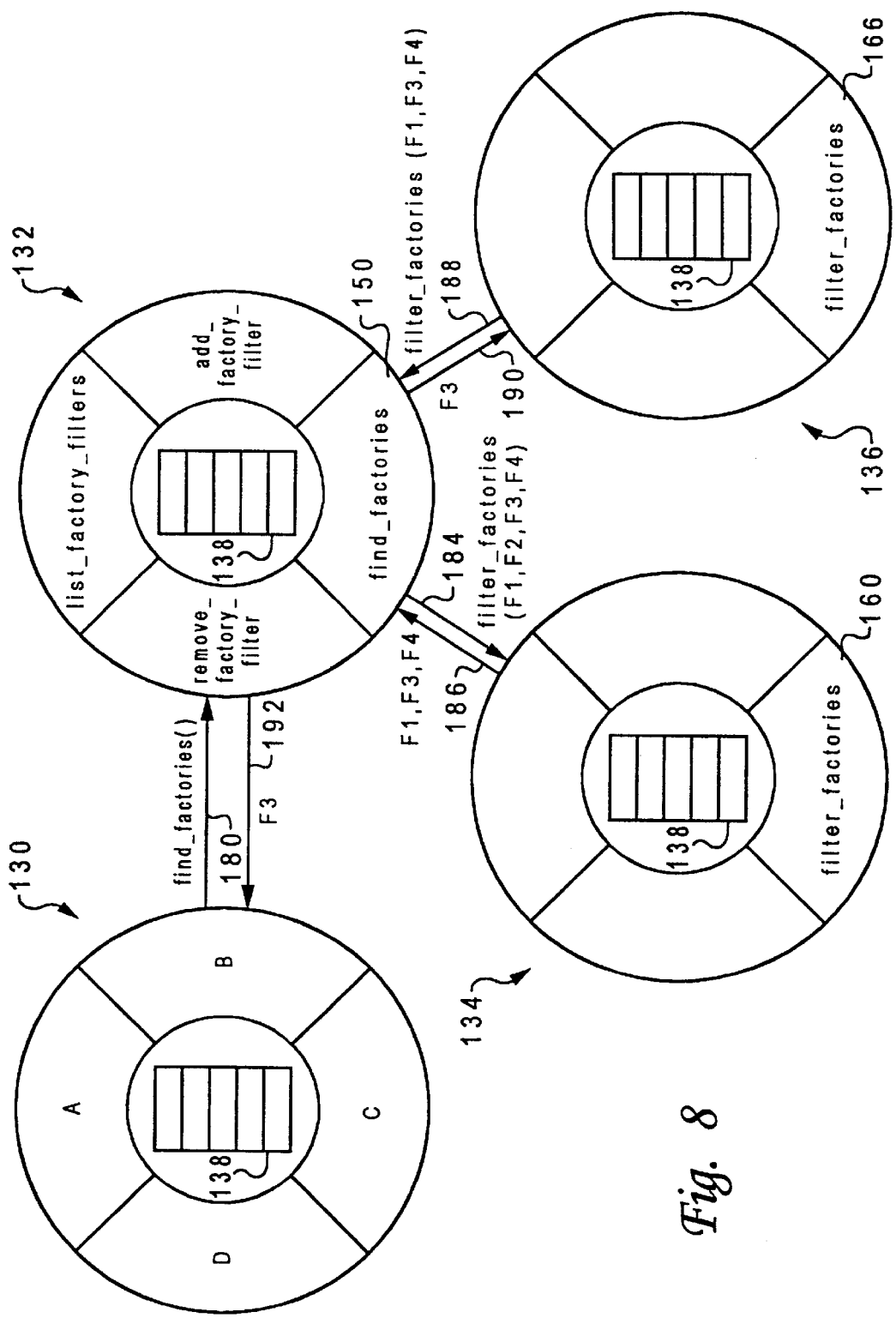
FIG. 8 depicts an object diagram detailing the interaction of a FactoryFilter object and other objects within a distributed object environment in accordance with a second illustrative embodiment of the present invention.
Figure 9:
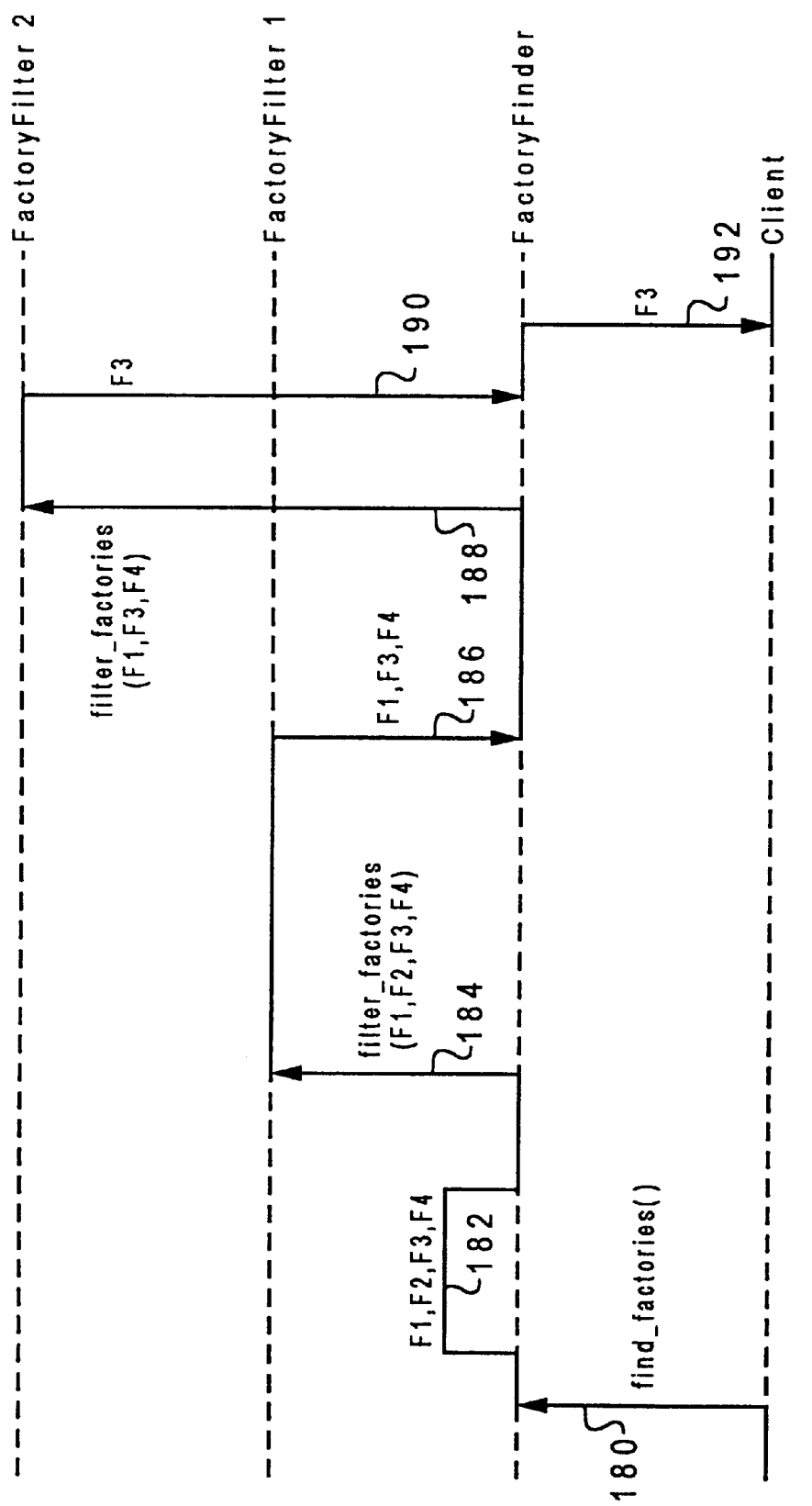
FIG. 9 illustrates a timing diagram of the interaction of a FactoryFilter object and other objects within a distributed object environment in accordance with a second illustrative embodiment of the present invention.

Referring now to FIGS. 8 and 9, there are depicted an object diagram of a distributed object environment and a timing diagram illustrating the interaction of objects within the distributed object environment in accordance with a second illustrative embodiment of the present invention. The second illustrative embodiment performs the same data filtering as did the first illustrative embodiment with the exception that the filter_factories methods of two registered FactoryFilter objects are invoked by the FactoryFinder object rather than by the client object. As shown in FIG. 8, the distributed object environment includes the same client object 130, FactoryFinder object 132, CPUFilter object 134, and OSFilter object 136 depicted in FIG. 6. In this case, CPUFilter object 134 and OSFilter object 136 are registered with FactoryFinder object 132 under a unique name through executing the add_factory_filter method for each, as described above with reference to FIG. 5.

As illustrated in FIGS. 8 and 9 at reference numeral 180, client object 130 invokes find_factories method 150 on FactoryFinder object 132 to obtain a listing of Factory objects qualified by user-specified factory_key parameters. In response to invocation by client object 130, find_factories method 150 locates all Factory objects that satisfy the specified object interface and any constraints specified within the factory_key. Find_factories method 150 further limits the returned sequence of Factory objects utilizing the factory interface specified in the factory_key parameter. As in the first illustrative embodiment depicted in FIGS. 6 and 7, Factory objects F1, F2, F3, and F4 are identified as Factory objects that satisfy the specified factory_key parameter, as depicted at reference numeral 182 of FIG. 9. However, rather than returning a sequence containing Factory objects F1, F2, F3, and F4 to client object 130, FactoryFinder object 132 automatically invokes the filter_factories methods of each FactoryFilter object registered with FactoryFinder object 132 in accordance with the second preferred embodiment of the present invention.

Thus, to discriminate the Factory objects within the sequence on the basis of the CPU usage of the servers upon which the Factory objects reside, FactoryFinder object 132 invokes filter_factories method 160 on CPUFilter object 134, passing the Factory object sequence containing Factory objects F1, F2, F3, and F4. The invocation of filter_factories method 160 is shown in FIG. 8 and 9 at reference numeral 184. Unless the factory_key passed by client object 130 to FactoryFinder object 132 contains a different CPU usage parameter, which is in turn passed in the invocation of filter_factories on FactoryFilter object 134, FactoryFilter object 134 applies the default CPU usage parameter that was specified when CPUFilter object 134 was registered with FactoryFinder object 132. Following the execution of filter_factories method 160, CPUFilter object 134 returns a sequence to FactoryFinder object 132 listing Factory objects F1, F3, and F4, as depicted at reference numeral 186. Thereafter, as illustrated at reference numeral 188, FactoryFinder object 132 discriminates the remaining Factory objects on the basis of the operating system running on the servers on which the Factory objects reside by invoking filter_factories method 166 on OSFilter object 136 and passing in Factory objects F1, F3 and F4. Again, the default value of the policy, which was specified when OSFilter object 136 was registered with FactoryFinder object 132, is passed when filter_factories method 166 is invoked unless a different value is specified within the factory_key, in which case that value is passed. Following completion of filter_factories method 166, OSFilter object 136 returns a sequence to FactoryFinder object 132 containing the single Factory object F3, as shown at reference numeral 190. FactoryFinder object 132 thereafter passes the sequence containing Factory object F3 to client object 130, as illustrated at reference numeral 192.

Although in the described examples, FactoryFilter objects of diverse subclasses were utilized to further qualify a FactoryFinder sequence, multiple FactoryFilter objects of the same subclass could alternatively be used. It will be understood that the applicability of the present invention is not limited to the filtering of Factory object sequences, but can also be applied to the filtering of any set of data elements utilizing a selected policy. Moreover, it is also important to note that while the invention has been described in the context of a HDCE, the functionality supported by the present invention can be embodied as a program product residing in a variety of media, including recordable media such as floppy disks and CD-ROMs as well as transmission media such as digital and analog communications links.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for filtering a list of data elements within an object-oriented environment, said method comprising:
   creating a filter object, wherein said filter object that supports a filter method that discriminates data elements within an input list specified by a message utilizing a filter criterion, wherein said step of creating a filter object comprises:
   defining an abstract filter cass that specifies an interface requiring an input list of data elements as an input; and
   constructing a plurality of filter objects that are instances of a particular subclass of said abstract filter class, wherein said plurality of filter objects includes the filter object, and wherein each of said plurality of filter objects is associated with a single finder object;
   receiving a message at said filter object, said message including an input list of a plurality of data elements to be filtered;
   in response to receipt of said message at said filter object, discriminating said plurality of data elements within said input list utilizing said filter criterion, said filter criterion including a particular value of a dynamic variable associated with each respective data element within said input list; and
   outputting from said filter object an output list containing only those data elements among said plurality of data elements that satisfy said filter criterion.

2. The method for filtering data of claim 1, wherein receiving a message at said filter object further comprises receiving the particular value of each respective dynamic variable in said message.

3. The method for filtering data of claim 1, wherein said step of discriminating data elements within said input list comprises eliminating data elements from said input list that do not satisfy said filter criterion.

4. The method for filtering data of claim 4, wherein outputting said output list comprises sending said output list of data elements that satisfy said filter criterion to a client object.

5. The method of claim 1, wherein said step of sending a message to said filter object including an input list of data elements to be filtered comprises sending a message to said filter object including an input list of objects to be filtered.

6. A method within a data processing system for filtering a list of data elements within an object-oriented environment, said method comprising:
   creating a filter object that supports a filter method for discriminating data elements within an input list specified by a message utilizing a filter criterion, wherein said step of creating a filter object comprises:
   defining an abstract filter class that specifies an interface requiring an input list of data elements as an input; and
   constructing a plurality of filter objects that are instances of a particular subclass of said abstract filter class, wherein said plurality of filter objects includes the filter object;
   creating a finder object that supports a finder method for searching said data processing system to locate data elements that satisfy a search criterion;
   registering said plurality of filter objects with said finder object, such that each of said plurality of filter objects is associated with a same finder object;
   in response to receipt of a message from a client object at said finder object, searching said data processing system utilizing said finder method to locate a plurality of data elements that satisfy said search criterion;
   sending a message from said finder object to said filter object that includes said plurality of data elements located by said finder object as an input list to be filtered;
   in response to receipt of said message by said filter object, discriminating said plurality of data elements within said input list utilizing said filter criterion, said filter criterion including a particular value of a dynamic variable associated with each respective data element within said input list; and
   outputting from said filter object an output list containing only those data elements among said plurality of data elements that satisfy said filter criterion.

7. The method for filtering data of claim 6, said data processing system comprising a distributed computer network including a plurality of computer systems coupled together for communication, wherein said step of searching said data processing system comprises searching selected computer systems among said plurality of computer systems within said distributed computer network.

8. The method for filtering data of claim 6, wherein said search criterion comprises a specified object class.

9. A data processing system for filtering a list of data elements within an object-oriented environment, said data processing system comprising:

a processor;

a memory coupled to said processor, said memory storing a plurality of filter objects within a particular subclass of an abstract filter class, wherein each of said plurality of filter objects is associated with a single finder object;

said plurality of filter objects including a filter object that comprises an instance of said particular subclass, wherein said filter object supports a filter method that, in response to receipt by said filter object of a message invoking said filter method, discriminates a plurality of data elements within an input list contained in the message utilizing a filter criterion, said filter criterion including a particular value of a dynamic variable associated with each respective data element within said input list, and wherein said filter object, following discrimination of said plurality of data elements by said filter method, outputs an output list containing only those data elements among said plurality of data elements in said input list that satisfy said filter criterion.

10. The data processing system of claim 9, wherein said message received by said filter object includes the particular value of each respective dynamic variable.

11. The data processing system of claim 9, wherein said filter method of said filter object eliminates data elements from said input list that do not satisfy said filter criterion.

12. The data processing system of claim 11, and further comprising:

a client object stored within said memory, wherein said filter method of said filter object sends said output list of data elements that satisfy said filter criterion to said client object.

13. The data processing system of claim 9, wherein said data elements in said input list comprise objects.

14. A data processing system for filtering a list of data elements within an object-oriented environment, said data processing system comprising:

a processor;

a memory coupled to said processor, said memory storing a plurality of filter objects within a particular subclass of an abstract filter class, said plurality of filter objects including a filter object, wherein said filter object supports a filter method that, in response to receipt by said filter object of a message invoking said filter method, discriminates data elements within an input list contained in said message utilizing a filter criterion, said filter criterion including a particular value of a dynamic variable associated with each respective data element within said input list;

a client object stored within said memory; and a finder object stored within said memory that supports a finder method for searching said data processing system to locate data elements that satisfy a search criterion, wherein said finder method has said input list of data elements as an output, and wherein said plurality of filter objects are registered with said finder object, such that each of said plurality of filter objects is associated with a same finder object and such that said finder object automatically provides said input list of data elements to said filter object in response to receipt of a message from said client object.

15. The data processing system of claim 14, said data processing system comprising a distributed computer network including a plurality of computer systems coupled together for communication, wherein said method for searching said data processing system comprises a method for searching selected computer systems among said plurality of computer systems within said distributed computer network.

16. The data processing system of claim 14, wherein said search criterion comprises a specified object class.

17. A program product for filtering a list of data elements within an object-oriented environment, said program product comprising:

a data processing system useable medium;

computer readable code, encoded within said computer useable medium, for causing said data processing system to create a filter object, wherein said computer readable code includes:

computer readable code for causing said data processing system to define an abstract filter class, wherein said abstract filter class specifies an interface requiring an input list of data elements as an input; and computer readable code for causing said data processing system to construct a plurality of filter objects within a particular subclass of said abstract filter class, wherein the plurality of filter objects includes the filter object and wherein each of said plurality of filter objects is associated with a single finder object;

wherein said filter object supports a filter method that, in response to receipt by said filter object of a message invoking said filter method, discriminates a plurality of data elements within an input list contained in the message utilizing a filter criterion, said filter criterion including a particular value of a dynamic variable associated with each respective data element within said input list, wherein said filter object, following discrimination of said plurality of data elements within said input list, outputs an output list containing only those data elements among said plurality of data elements that satisfy said filter criterion.

18. The program product of claim 17, wherein said filter method of said filter object obtains the particular value of each respective dynamic variable from said message.

19. The program product of claim 17, wherein said filter method eliminates data elements from said input list that do not satisfy said filter criterion.

20. The program product of claim 19, and further comprising:

computer readable code, encoded within said data processing system useable medium, for causing said data processing system to send said output list of data elements that satisfy said filter criterion to a client object.

21. A program product of claim 17, wherein said data elements discriminated by said filter method comprise objects.

22. A program product for filtering a list of data elements within an object-oriented environment, said program product comprising:

a plurality of filter objects within a particular subclass of an abstract filter class, wherein said plurality of filter objects includes a filter object that supports a filter method that discriminates a plurality of data elements within an input list contained in a message utilizing a filter criterion, said filter criterion including a particular value of a dynamic variable associated with each respective data element within said input list;

a finder object with which said plurality of filter objects may be registered such that each of said plurality of filter objects is associated with a same finder object, wherein said finder object supports a finder method for searching said data processing system to locate said plurality data elements that satisfy a search criterion and automatically provides said plurality of data elements that satisfy said search criterion to said filter object as said input list in response to receipt of a message from a client object while said filter object is registered; and a data processing system useable medium encoding said plurality of filter objects and said finder object.

23. The program product of claim 22, said data processing system comprising a distributed computer network including a plurality of computer systems coupled together for communication, wherein said code for causing said data processing system to search said data processing finder method causes said data processing system to search selected computer systems among said plurality of computer systems within said distributed computer network.

24. The program product of claim 28, wherein said search criterion comprises a specified object class.

* * * * *

UNITED STATES PATENT AND TRADEMARK OFFICE
CERTIFICATE OF CORRECTION

PATENT NO.     : 6,269,407 B1
DATED          : July 31, 2001
INVENTOR(S)    : Cink et al.

It is certified that error appears in the above-identified patent and that said Letters Patent is hereby corrected as shown below:

<u>Title page, Item [54], and Column 1, Line 1,</u>
Delete "METHOD AND SYSTEM FOR DATA FILTERING WITHIN AN OBJECT-ORIENTED DATA" and replace with -- METHOD AND SYSTEM FOR DATA FILTERING WITHIN AN OBJECT-ORIENTED DATA PROCESSING SYSTEM --.

<u>Column 14,</u>
Delete lines 1-8 which currently read " The program product of claim 22, said data processing system comprising a distributed computer network including a plurality of computer systems coupled together for communication, wherein said code for causing said data processing system to search said data processing finder method causes said data processing system to search selected computer systems among said plurality of computer systems within said distributed computer network" and replace lines 1-8 with -- The program product of Claim 22, said data processing system comprising a distributed computer network including a plurality of computer systems coupled together for communication, wherein said finder method causes said data processing system to search selected computer systems among said plurality of computer systems within said distributed computer network. --

Line 9, delete "28" and replace with -- 22 --.

Signed and Sealed this

Eleventh Day of June, 2002

*Attest:*

*Attesting Officer*

JAMES E. ROGAN
*Director of the United States Patent and Trademark Office*